H. J. SMITH.
Steering Apparatus for Vessels.

No. 137,574. Patented April 8, 1873.

WITNESSES.  INVENTOR.

UNITED STATES PATENT OFFICE.

HENRY JULIUS SMITH, OF BOSTON, MASSACHUSETTS, ASSIGNOR TO WILLIAM B. FOWLE, OF SAME PLACE.

IMPROVEMENT IN STEERING APPARATUS FOR VESSELS.

Specification forming part of Letters Patent No. 137,574, dated April 8, 1873; application filed January 4, 1873.

*To all whom it may concern:*

Be it known that I, HENRY JULIUS SMITH, of Boston, in the State of Massachusetts, have invented an Improved Steering Apparatus for Vessels Propelled by Steam, of which the following is a full and correct description:

It is especially designed for use in torpedo-vessels navigated from a distance; but may be applied to any vessel propelled by steam.

The invention relates to the use of an engine for governing the rudder; its object being to employ the propelling-engine of the vessel to open and shut the valves of the engine connected with the rudder.

Figure 2:
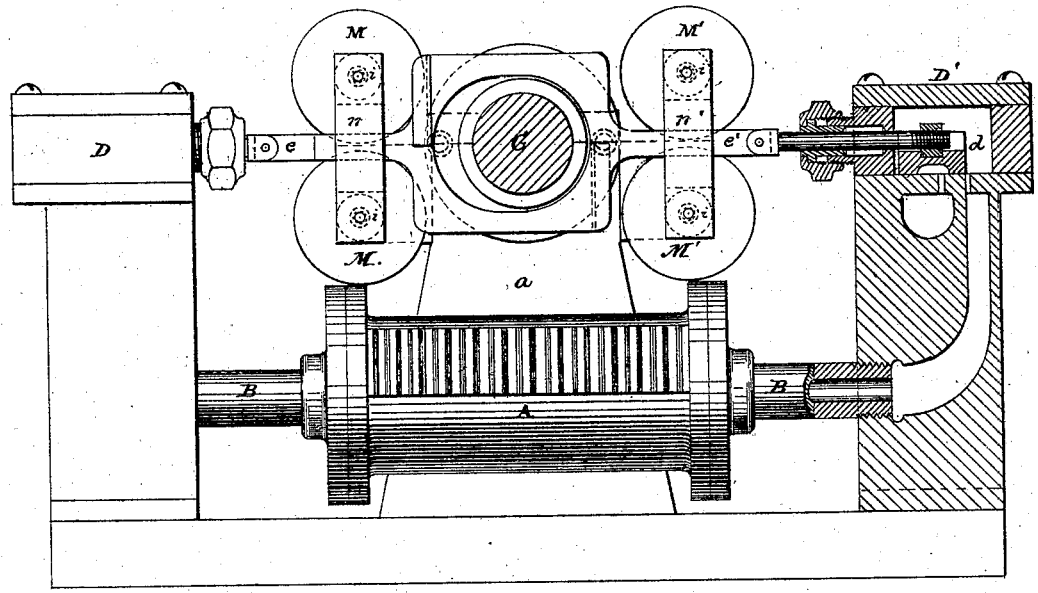
Figure 1:
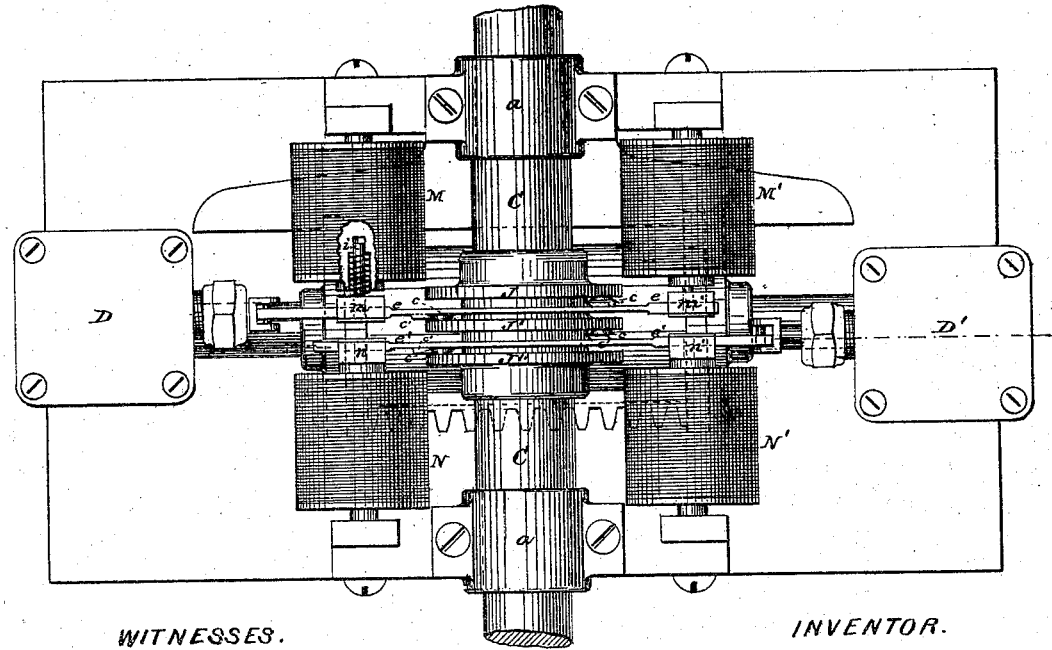

In the drawing, Figure 1 is a plan of an apparatus embracing my invention. Fig. 2 is a sectional elevation of the same.

A is the cylinder of the engine, which directly controls the rudder, the cylinder traveling to the right and left upon a fixed piston or steam-pipe, B, and having a rack, as shown, which gears with a toothed sector on the rudder-post. The piston-head of the cylinder is also fixed, and the steam driving the cylinder enters it from the pipe B at either face of the piston-head, accordingly as certain valves are opened or closed.

Various devices for governing such valves have been elsewhere shown or suggested. I have now devised a means by which the propeller-shaft may be made to open and close these valves. In vessels navigated by persons on board, hand-levers are intended to be used to throw the mechanism into or out of gear. In this instance I have used electricity to throw mechanism connected with the valves into or out of gear with the propeller-shaft; but I make no claim in this application to the use of electricity, or its combination with the other devices described; my invention being the combination of a propeller-shaft and steering apparatus, and suitable means by which the two may be thrown into and out of gear. Since, however, this use of a propeller-shaft will be found especially useful in navigating vessels from a distance, where electricity must be employed, and since I have made use of a propeller-shaft and steering apparatus for this latter purpose, I proceed to describe the particular method I have devised for throwing the two into and out of gear.

C is the propeller-shaft, having bearings in supports $a\ a$, as shown. D and D' are steam-chests on either side of the rudder-engine, and having valves $d$ (but one is shown) communicating with the engine. To open and close these valves by the propeller-shaft, revolved by the main engine, is the object of the invention. J, J', and J'' are three collars upon the propeller-shaft. Upon these collars are pins $c\ c\ c\ c$ with beveled heads, as shown, the collars J and J'' having each a pin on the inner face, and the collar J' having a pin on each face, as shown. M and M' and N and N' are two sets of electro-magnets, having, respectively, armatures $m\ m'\ n\ n'$, as shown. Each of these armatures is slotted at the center to receive a sliding rod, $e$ and $e'$, the rod $e$ resting in the armatures $m$ and $m'$, and the rod $e'$ resting in the armatures $n$ and $n'$. Both these rods swell at the center, having a slot embracing the propeller-shaft, but of such shape as to allow them to slide to the right or left. The rods $e$ and $e'$ are held in their places in the armatures by straps over the slots in the armatures. Their outer ends are connected, respectively, with the valve-stems of the valves $d$, as shown. Each of these rods, at the slot embracing the propeller-shaft, has a small lug, $c'$, upon either face, whose office is to engage with the beveled pins $c$ on the collars upon the propeller-shaft.

It is obvious that, when the pin upon the collar J strikes the outer lug upon the sliding rod $e$, it pushes the sliding rod to one side and opens one of the valves; and when the pin upon the collar J'' strikes the outer lug upon the sliding rod $e'$, it in the same manner opens the other valve. Each of these sliding rods is independent of the other, and the lug upon each is brought into play with its respective beveled pin $c$ whenever its armatures are attracted to their magnets.

It is needless to say that the magnets M and M' are charged together, and in like manner the magnets N and N'.

A valve being once opened is kept open with very little waste of power by friction, owing to the small size of the pins and lugs.

The object of the collar J' is to close the valves. This it does through its pins $c\ c$ coming in contact with the inner lugs $c'$ of one or both the sliding rods; and this contact is made by repelling the armatures from their magnets. For this purpose each arm of each magnet is provided with a spiral spring, as shown more fully in the magnet M, which drives back the armature when the magnet is not charged. Each magnet is also furnished with a pin, $i$, as shown, which passes through the armature and serves as a guide to keep the armatures in place. From this arrangement it results that each pair of armatures, $m$ and $m'$ and $n$ and $n'$, has a back-and-forward motion toward and away from its magnets, and that each sliding bar has this same motion toward and away from the magnets, and also a motion at right angles to the other, to open or close the valves.

The operation is obvious: One set of magnets being charged, one of the valves is opened, and the traveling cylinder moves the rudder in one direction; the other set being charged, the other valve is opened, and the rudder is turned in the other direction. When neither magnet is charged, the middle collar J' engages with the inner lug $c'$ upon both sliding rods and closes the valves, and the rudder assumes a position amidships.

The lugs upon the sliding rods are marked $c'$.

I claim—

The combination of a propeller-shaft, steering-engine, and suitable means for throwing the valve-connections of the latter into and out of gear, the combination being and operating substantially as described.

The above specification of my said invention signed and witnessed at Washington this 4th day of January, A. D. 1873.

H. JULIUS SMITH.

Witnesses:
  CHAS. F. STANSBURY,
  WILLIAM W. SWAN.